United States Patent
Kellick

(10) Patent No.: US 7,625,013 B2
(45) Date of Patent: Dec. 1, 2009

(54) SPRAY SUPPRESSION DEVICE FOR VEHICLES

(75) Inventor: Timothy W. Kellick, Webster Groves, MO (US)

(73) Assignee: Solutia, Inc., St. Louis, MO (US)

( * ) Notice: Subject to any disclaimer, the term of this patent is extended or adjusted under 35 U.S.C. 154(b) by 399 days.

(21) Appl. No.: 11/552,618

(22) Filed: Oct. 25, 2006

(65) Prior Publication Data
US 2008/0100053 A1     May 1, 2008

(51) Int. Cl.
*B62D 25/16*     (2006.01)
*B62D 25/18*     (2006.01)

(52) U.S. Cl. .................... 280/851; 280/847; 280/848; 280/853

(58) Field of Classification Search ............ 280/847, 280/848, 851, 853, 152.05, 152.1, 152.2, 280/852, 160
See application file for complete search history.

(56) References Cited

U.S. PATENT DOCUMENTS

| | | | |
|---|---|---|---|
| 3,088,751 A | | 5/1963 | Barry et al. |
| 3,279,818 A | * | 10/1966 | Jones .................. 280/851 |
| 3,350,114 A | | 10/1967 | Salisbury |
| 4,205,861 A | * | 6/1980 | Roberts et al. ............ 280/851 |
| 4,372,570 A | * | 2/1983 | Goodall ................. 280/851 |
| 4,585,243 A | | 4/1986 | Lockwood et al. |
| 4,598,000 A | | 7/1986 | Mantarro |
| 4,660,846 A | | 4/1987 | Morin |
| 4,921,276 A | | 5/1990 | Morin |
| 5,022,680 A | | 6/1991 | Eklund, Jr. |
| 5,080,397 A | * | 1/1992 | Metcalf ................ 280/851 |
| 5,205,590 A | | 4/1993 | Dräbing et al. |

(Continued)

FOREIGN PATENT DOCUMENTS

EP     0791525     8/1997

(Continued)

OTHER PUBLICATIONS

U.S. Department of Transportation, National Highway Traffic Safety Administration, Update on the Status of Splash and Spray Suppression Technology for Large Trucks, Report to Congress, Mar. 2000.

(Continued)

*Primary Examiner*—Christopher P Ellis
*Assistant Examiner*—Bryan A Evans
(74) *Attorney, Agent, or Firm*—Husch Blackwell Sanders LLP

(57) ABSTRACT

The present invention discloses an improved spray suppression device for vehicles. One embodiment of the present invention comprises a front panel having generally opposed first and second main surfaces and being configured to have a plurality of first through openings laterally and longitudinally spaced apart from each other, each forming a flow path through the front panel and a plurality of protrusions each having a cap and at least one post, connected to said front panel and positioned to project from the first main surface for substantially facing their leading wheel of the vehicle. Each cap is positioned substantially above at least one said first opening in said front panel and forming a second opening between the first main surface and the cap. The present invention provides a mud flap which allows air to pass through its opening without clogging with mud, rocks, and road debris.

30 Claims, 6 Drawing Sheets

U.S. PATENT DOCUMENTS

| | | | | |
|---|---|---|---|---|
| 5,273,318 | A | * 12/1993 | Nakayama et al. | 280/851 |
| 5,366,247 | A | 11/1994 | Fischer | |
| 5,375,882 | A | 12/1994 | Koch, III | |
| 5,564,750 | A | * 10/1996 | Bajorek et al. | 280/851 |
| 5,582,430 | A | * 12/1996 | Bauer et al. | 280/851 |
| 6,139,062 | A | 10/2000 | Meyer | |
| 6,799,782 | B2 | * 10/2004 | Jain et al. | 280/848 |
| 6,851,717 | B1 | 2/2005 | Andersen | |

FOREIGN PATENT DOCUMENTS

| | | |
|---|---|---|
| EP | 0899185 | 8/2002 |
| GB | 2242B76 | 4/1990 |
| GB | 2322346 | 2/1997 |

OTHER PUBLICATIONS

Manser, Ph.D., Michael P., Evaluation of Splash and Spray Suppression Devices on Large Trucks During Wet Weather, AAA Foundation for Traffic Safety, Washington, DC, Oct. 2003.

* cited by examiner

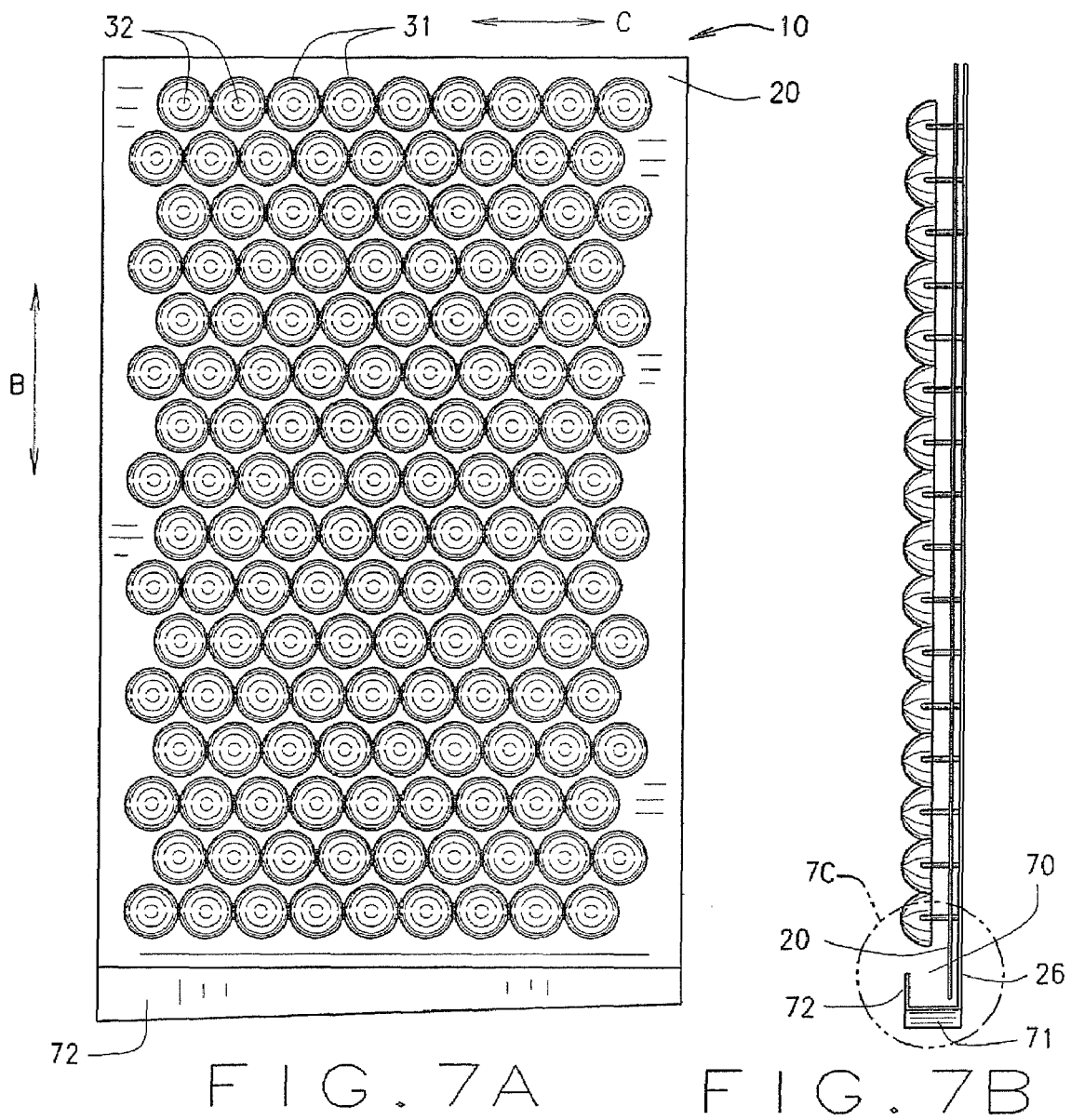
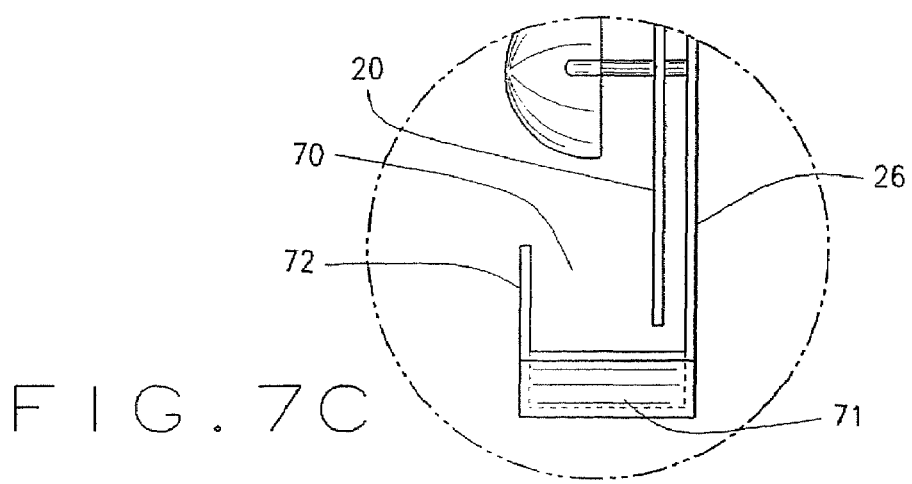
FIG. 7A  FIG. 7B
FIG. 7C

SPRAY SUPPRESSION DEVICE FOR VEHICLES

BACKGROUND OF INVENTION

This invention relates generally to spray suppression devices, such as mud flaps, adapted for use on wheeled vehicles such as trucks. More particularly, the invention relates to an integrally-formed spray suppression device having openings adapted to allow air and water to pass therethrough. Each opening has a cover thereover to deflect substantially all of the incident water without clogging with roadway debris it encounters.

The term "spray" in the present application includes spray, splash or both. Splash and spray produced by large trucks in wet weather generally creates poor visibility for trailing and passing drivers. The terms "splash and spray" are commonly used together to describe the adverse effects on visibility caused by vehicles traveling on wet roads. "Splash" consists of very large liquid droplets that hit the pavement. Occasionally, splash may strike adjacent vehicles' windshields if there is puddling or uneven wetting of the roadway surface in front of the truck (or other vehicle). This condition can obscure vision for a brief period. "Spray" consists of very small liquid droplets that remain airborne for a long time in the form of a fog cloud before falling to the ground. Spray is formed when three elements are present: (1) water, (2) a hard or smooth surface struck by the water, and (3) turbulent air flow to pick up and carry the water after it strikes the surface. The interaction of the three elements produces small droplets of water which remain airborn for a time, in the form of a "fog" cloud projecting from the surface which they struck last. Because the "fog" can linger as long as the cloud's water is replenished, spray can surprise and confuse a driver who is not able to orient himself and his vehicle because of the inability to see through the cloud of airborne water droplets. The cumulative consequences of splash and spray are primarily depositing dirt on surfaces critical to visibility—windshields and windows, mirrors, signs, and vehicle bodies—influencing what drivers can see and how well they can see. Visibility and driver vision issues related to splash and spray can also play a significant role in terms of pedestrian safety. Splash can be a problem for drivers of following vehicles attempting to pass (or driving in adjacent lanes) and oncoming vehicles, with the concern being a potential loss of control.

While conventional solid mud flaps, which have no through openings, are somewhat effective in deflecting water and roadway debris, they suffer from several disadvantages. First, the solid surface design of the conventional mud flap prevents air from passing through it, thereby increasing the drag created by the mud flap and decreasing fuel economy. Also, the lower portion of a solid mud flap may be displaced rearwardly when the vehicle is moving at high rates of speed, thereby reducing the amount of water and debris the mud flap deflects. Further, the conventional solid mud flap increases the temperature in the area of the tire of the vehicle because air is not permitted to flow through the mud flap. Increased temperature in the area of the tire increases the risk of tire failure. In addition, the solid design of the typical mud flap prevents any water or other roadway debris encountered by the mud flap from passing through the mud flap. As a result, a large proportion of the water and other roadway debris encountered by a conventional solid mud flap is projected off the sides of the mud flap and into the paths of other vehicles.

An example of the common prior art on heavy trucks to help reduce wheel spray is the traditional mud flap that is enhanced with surface materials ranging in nature from Astroturf® or grass-like material to grooved surface treatments. The basic intent of a grass-like substance is to absorb and dissipate the energy of the water spray, temporarily trapping water within its texture prior to draining it on to the road surface behind the tire(s). However, the grass-like spray suppressions can become clogged with mud, rocks, and other road debris.

Several modifications have been made to the conventional solid mud flap to address the disadvantages identified above. For example, non-grass options were being looked at to reduce/eliminate clogging of the flap. Further, mud flaps have been provided with openings to permit some air, water and other debris to pass through the mud flap. Typically, the openings are defined, at least in part, by rearwardly and downwardly extending louvers or flaps. For example, U.S. Pat. No. 3,350,114 to Salisbury describes a mud flap having a plurality of flexible flaps adapted to be opened by a stream of water and capable of deflecting said stream downwardly. Absent a stream of water, however, the flexible hinged flaps remain substantially closed over the aperture with which each is associated. As a result, the flexible flaps do little to reduce the drag created by the mud flap, the weight of the mud flap, the rearward displacement of the bottom of the mud flap at high speeds, or the increased temperature in the area of the tire.

Several patents describe mud flaps having openings defined by louvers. See, e.g. U.S. Pat. Nos. 3,088,751; 4,660,846; and 4,921,276. U.S. Pat. No. 5,366,247 to Fischer describes a vehicle splashguard having louvers adapted to deflect water and other debris downwardly rather than sidewardly or rearwardly into the path of following traffic. The louvers extend generally horizontally across substantially the entire width of the splashguard. Similarly, U.S. Pat. No. 5,564,750 to Bajorek et al. describes a mud flap having louvers that extend horizontally across substantially the entire width of the mud flap. In addition, the mud flap of Bajorek includes a vertical rib member midway between the ends of each louver to provide vertical support to the louvers.

U.S. Pat. No. 5,582,430 to Bauer, et al. describes a spray protection device having an inlet layer and a spacer layer which creates a void therebetween. EP 899,185 to Turpeinen, et al. discloses a method of forming openings and spray-guiding members in a splash panel to be affixed to the mudguard and/or the mud-flap of a vehicle or the like for collecting and guiding spray of surface water from the wheels.

The prior art spray suppression devices that utilize 3-dimensional protrusions (i.e. plastic grass, studs, etc.) or other materials with small holes (i.e. mesh netting, fabrics, etc.) are all easily clogged with mud, rocks, and road debris. Cleaning these devices can be difficult, time consuming, and expensive. Several examples of three dimensional thermoplastic spray suppression devices consisting of vanes, ribs, channels, perforations, holes, and injection molded surfaces exist in the prior art and have tried to solve this problem of clogging while still meeting minimum spray suppression requirements. Many of these devices have portions of their surface which are flat and devoid of spray suppression potential.

It would be desirable, therefore, if a mud flap could be provided which reduces the amount of splash and spray that is projected off the sides and tread portion of the wheels (including the tires). It would also be desirable if a mud flap could be provided which allows air to pass through its opening without clogging with mud, rocks, and road debris.

Further objectives and advantages of the present invention will become apparent from a careful reading of a detailed description provided hereinbelow, with appropriate reference to accompanying drawings.

SUMMARY OF INVENTION

The spray suppressant mud flaps are mounted on the inner surface of existing mud guard fenders, or separately as conventional mud flaps mounted vertically behind individual or tandem wheel sets. One embodiment of the present invention has the benefit of a plurality of inclined or curvilinear surfaces over a substantial portion of the forward facing area of the spray suppression surface. As the spray impacts the inclined surfaces it is deflected around and then behind the caps having the curved forward surfaces which in turn serve to trap and collect rebounding spray. The spray then moves through the holes into the gap between the opposed first and second main surfaces of the flap panels. Subsequent spray then avoids hitting the draining water which could induce additional spray.

The present invention discloses an improved spray suppression device for vehicles. One embodiment of the present invention comprises a first or front panel having generally opposed first and second main surfaces and being configured to have a plurality of first through openings laterally and longitudinally spaced apart from each other, each forming a flow path through the front panel and a plurality of protrusions each having a cap and at least one post, connected to said front panel and positioned to project from the first main surface for substantially facing their leading wheel of the vehicle. A cavity is formed inside the trailing portion of the cap. The cavity is closed at the distal end of the cap and opened at the proximal end of the cap from the first main surface. Two adjacent protrusions can be configured to share one post connecting each cap to the front panel. Each protrusion is positioned substantially above at least one said first opening in said front panel and forming a second opening between the first main surface and a portion of the protrusion. The flow paths are defined by the trailing edge of each cap and the side edges of each post and the front panel.

A further embodiment of the present invention comprises a back panel spaced apart from the second main surface of the front panel defining a flow path therebetween. The back panel is connected to the front panel. The bottom edges of both the front panel and the back panel are configured to define a fluid flow discharge.

A further embodiment of the present invention comprises the caps which are in the shape of a substantial segment of a sphere, e.g., a hemisphere. Another embodiment of the spray suppression device comprises protrusions with a cap, each cap having a substantially conical outer surface.

In a further embodiment of the spray suppression device comprises the protrusions attached to each other laterally and/or longitudinally at adjacent tangent points.

Another embodiment of the spray suppression device comprises a substantially normally planar front panel having a plurality of through openings laterally and longitudinally spaced apart from each other. Each protrusion comprises a cap having a contour inclined backwardly and outwardly from their respective apex, for substantially facing their leading wheel of the vehicle. Further, each cap is positioned substantially in covering relationship to a respective opening in the front panel, and at least one flow path formed between an opening and the back edge of a respective cap. Each cap at its back edge has approximately the same transverse cross-sectional area and shape as the transverse cross-sectional area and shape of a respective opening.

BRIEF DESCRIPTION OF DRAWINGS

FIG. 7A illustrates a front view of one embodiment of the spray suppression device.

FIG. 7B illustrates a fragmentary side view of one embodiment of the spray suppression device.

FIG. 7C illustrates an exploded side view of one embodiment of the spray suppression device.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts or construction.

DETAILED DESCRIPTION

Before describing the present invention, it will be understood that variations of the present invention may be applied in combination with spray suppression devices, and it is not limited to the specific examples described herein.

Figure 1:
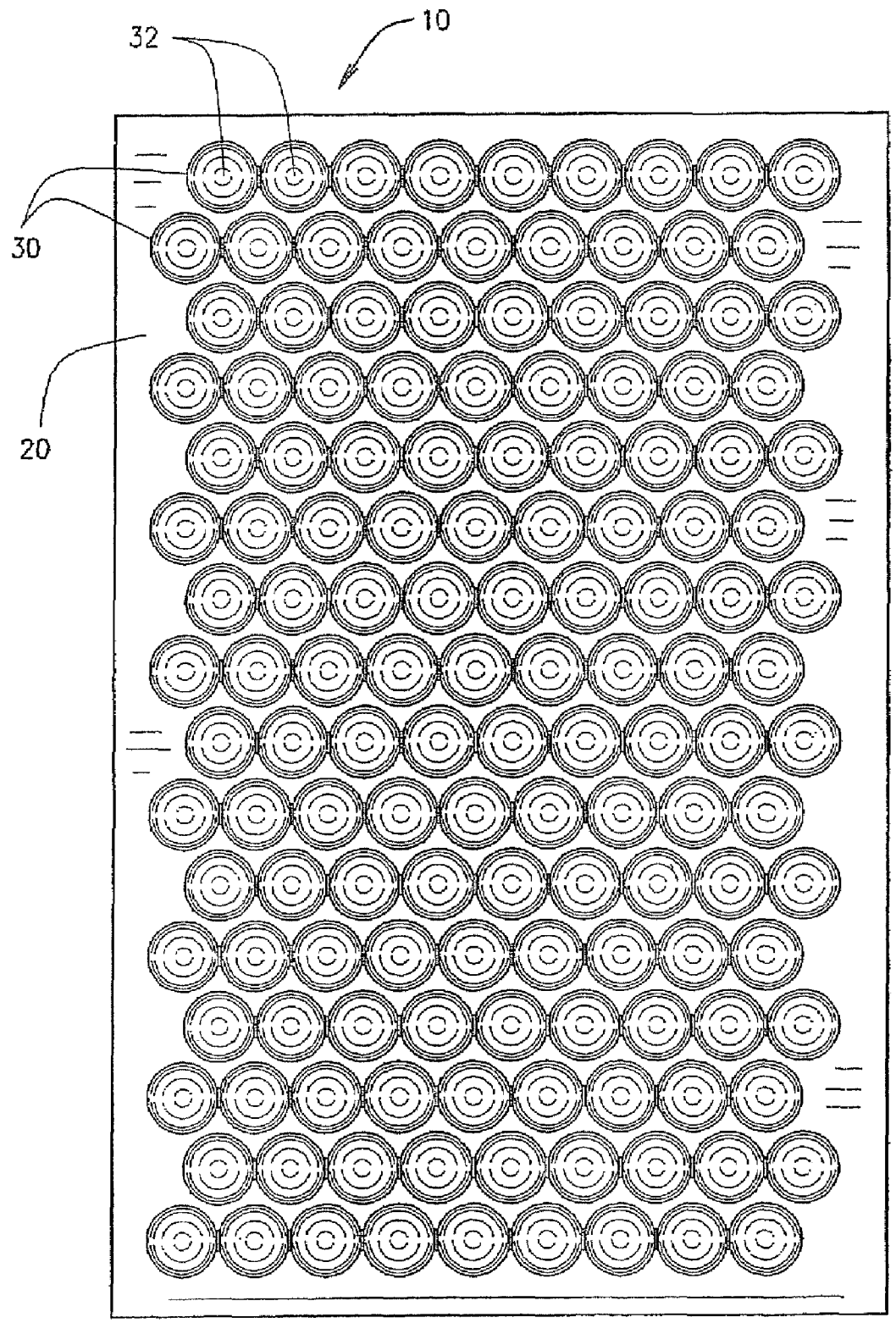
FIG. 1 illustrates a view of an embodiment of the spray suppression device in accordance with the present invention.
Figure 2:
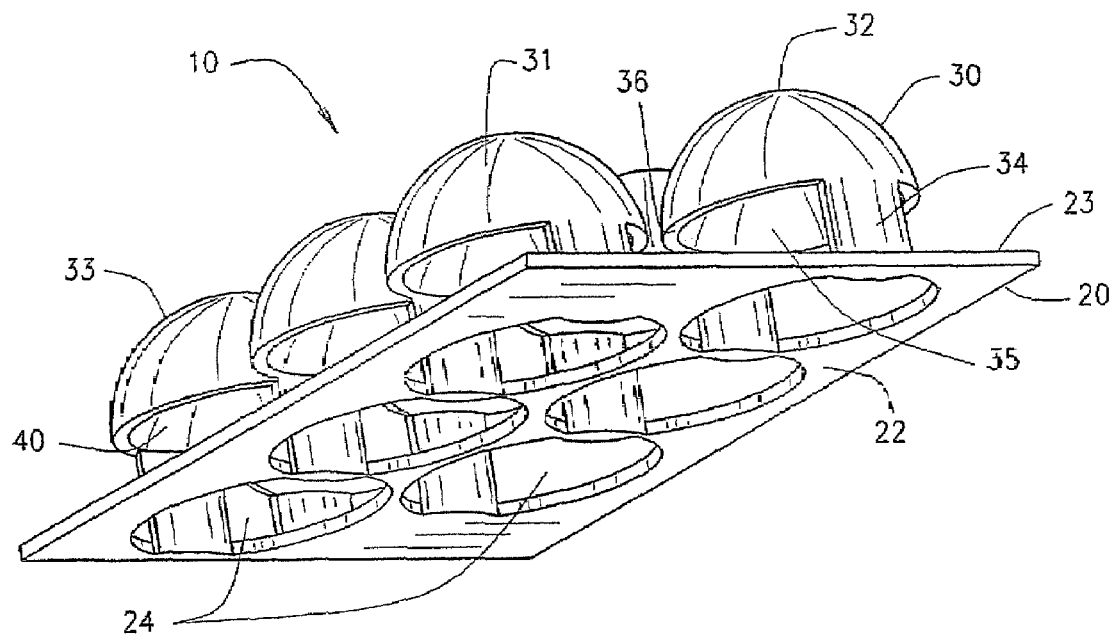
FIG. 2 illustrates a fragmentary perspective view of a front panel and protrusions of the spray suppression device from bottom. A back panel and extended posts are redacted for clarity and brevity.
Figure 3:
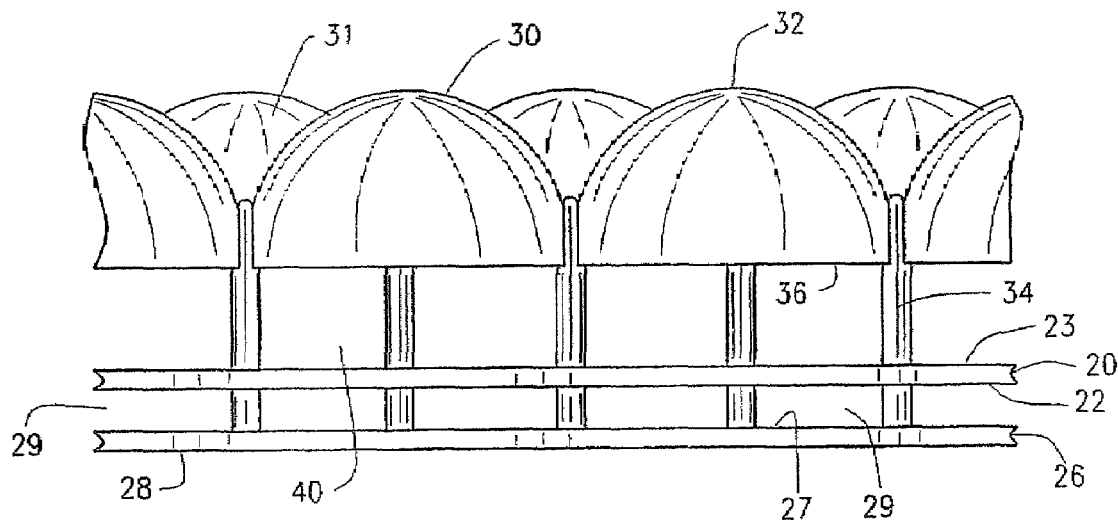
FIG. 3 illustrates a side view of the spray suppression device.

As illustrated in FIGS. 1-4, the spray suppression device 10 comprises a three-dimensional and preferably integrally molded structure which provides a surface for impinging water thrown from the vehicle wheels. The spray suppression device 10 comprises a front panel 20. The front panel 20 includes a plurality of through holes or openings 24 extending between opposite main surfaces 22, 23 and the holes 24 are preferably arranged relatively close to each other as illustrated in FIGS. 1 and 3. The front panel 20 of this application means the panel 20 facing toward the front of the vehicle, which has through holes 24. On the other hand, the back panel 26 of this application means the panel 26 facing toward the back of the vehicle and has opposed main surfaces 27, 28. The holes 24 are laterally and longitudinally spaced apart from each other in an X-Y matrix or array, e.g. rows and columns or rows and staggered columns. The holes 24 can have different sizes, preferably in the range of 1.0 to 2.0 inch diameter when they are round. A preferred front panel 20 is generally rectangular in shape, but it is also contemplated within the scope of the invention that the panel may be any suitable shape for deflecting water and roadway debris propelled by the wheels of a motor vehicle (not shown). The description of the device 10 regarding the positions and orientations of the various parts are based on the device 10 being in a use orientation of generally vertical.

The spray suppression device 10 may be manufactured using any suitable material including metallic material (e.g., steel), heavy fabric, composites, fiberglass, plastic or any suitable elastomeric or polymeric material such as low or high density polyethylene or polypropylene. Reinforcing filler may be added if desired. It is also contemplated within the scope of the invention that the front panel 20 may be made from metal or a combination of a metallic material and an elastomeric or polymeric material. Preferably, the entire panel 20 is made of a thermoplastic material, but is not required to be.

Figure 4:
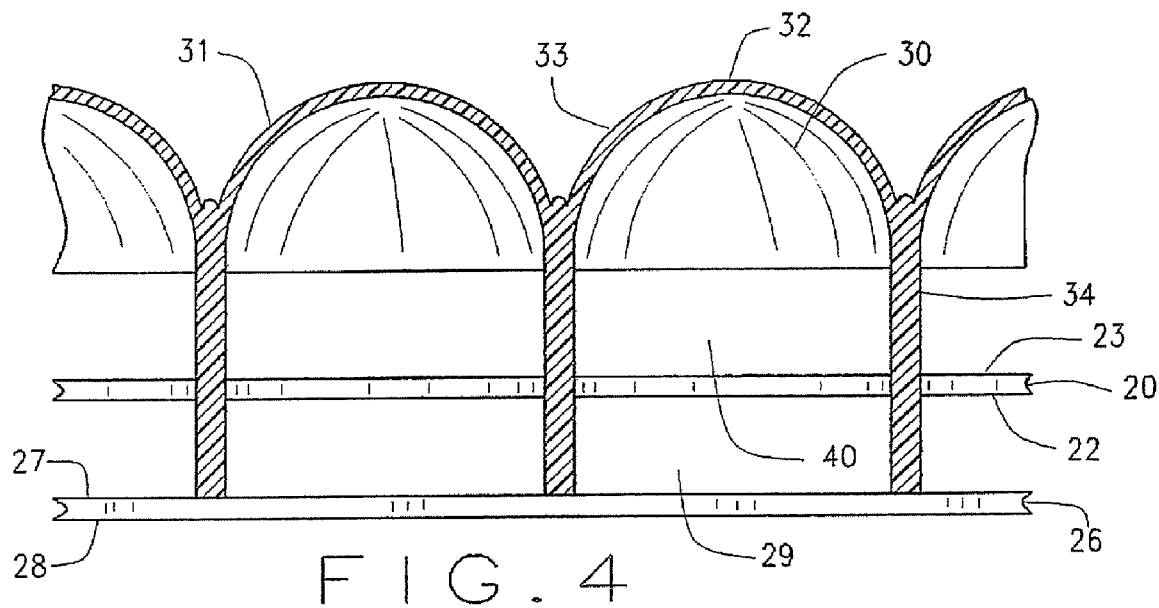
FIG. 4 illustrates a fragmentary side view of an opening and a protrusion of the spray suppression device.

The spray suppression device 10 of this invention will generally comprise a plurality of upstanding protrusions 30 mounted to the front panel 20 and preferably having a forward facing rearwardly inclined impact surface, e.g., a curved leading surface 31. Preferably the panel 20 and protrusions 30 are integrally formed by molding, such as injection molding. In one embodiment, the protrusions 30 have caps 33 which are in the shape of a substantial segment of a sphere, e.g., a hemisphere. Alternatively, the caps 33 can have a generally conically shaped surface 31. Generally, various suitable geometries may be employed to achieve similar effect, including substantially conical, elliptic, or parabolic forms. The protrusions 30, in a preferable embodiment, are integrally molded with the front panel 20. Each protrusion 30 comprises a cap 33 and at least one support post 34 extending from rear edge 36 of the cap 33 to the front panel 20. In a preferred embodiment, the cap 33 has a hollow or concave inner surface as shown in FIG. 2. A cavity 35 is formed inside the cap 33. The cavity 35 is closed at the top or free end 32 of the cap 33 and open at the bottom or trailing edge 36 of the cap 33. Some of the air flow, which has passed through a flow path 40 between the front panel 20 and the cap 33, circulate in the cavity 35. The forward or leading impact surface 31 is inclined preferably in a conical or curved fashion from end 32 to edge 36. In one embodiment, adjacent caps 33 can be configured to share a support 34 as illustrated in FIGS. 3 and 4. FIG. 1 illustrates the arrangement of the spray suppression device 10 relative to the wheel or tire of the vehicle. The main body of the spray suppression device 10 is so arranged that its protrusions 30 generally face their immediately leading tire of the vehicle. The water thrown up by the wheel of the vehicle splashes up diagonally (relative to horizontal) onto the surface of the protrusions 30 and is slowed down or broken up there so that the water loses kinetic energy. The intercepted and braked water is acted upon by the force of gravity on the one hand, and on the other, by forces created by the movement of the air around the wheels. The protrusions 30 are arranged in an array and are positioned relatively close to each other in rows and columns or offset rows and columns and cover a substantial portion of the face including holes 24 and surface 23 of the panel 20. In one embodiment of the present invention, the protrusions 30 are attached to each other laterally at their support posts 34. The construction of the protrusions 30 and the holes 24 can be seen in detail in FIG. 4. The protrusions 30 and the holes 24, preferably, have approximately equal cross-sectional areas to help effect formation by molding. As shown, they are configured for ease of molding as by injection molding.

Figure 8:
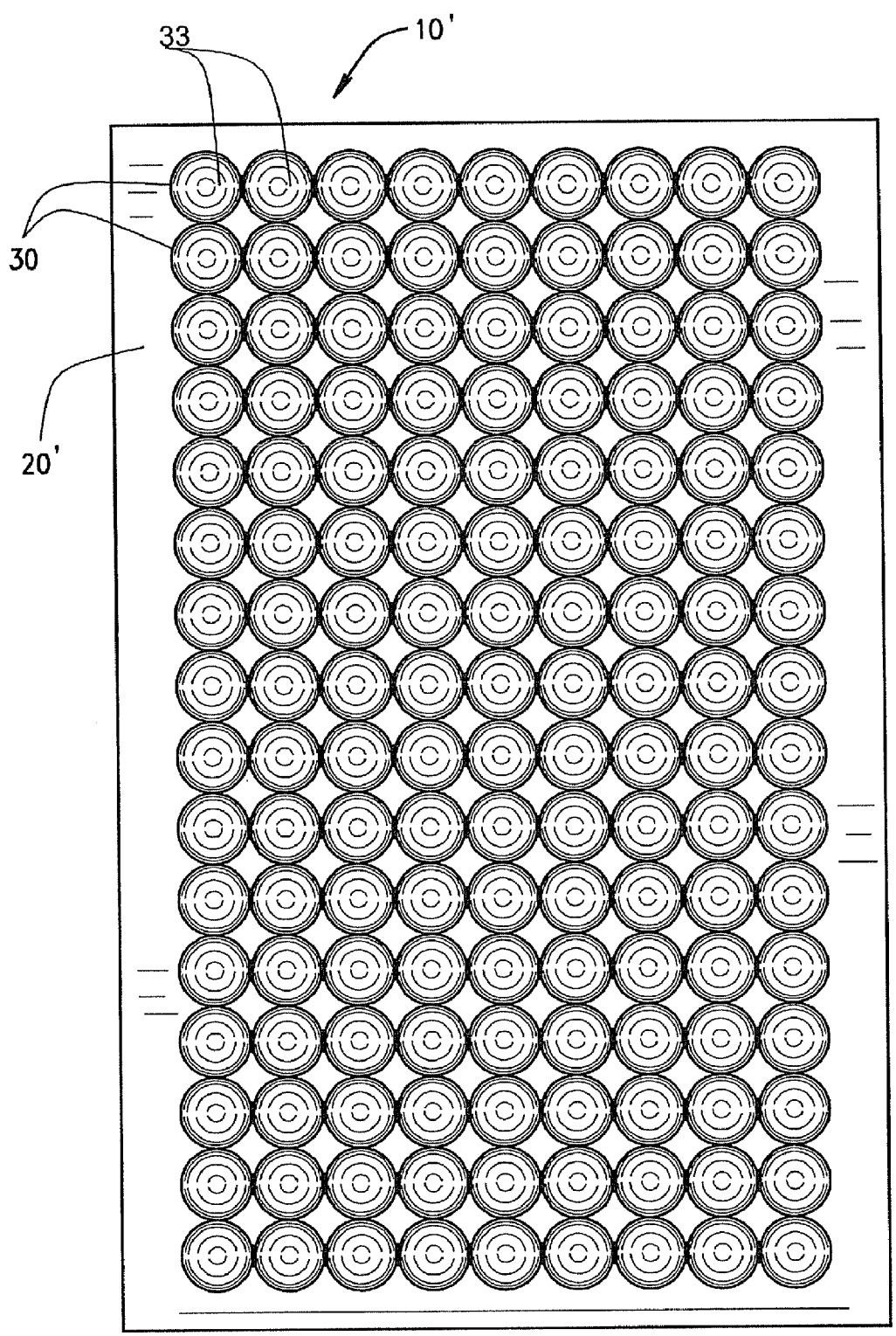
FIG. 8 illustrates a view of another embodiment of the spray suppression device in accordance with the present invention.

In the preferred embodiment, the caps 33 form an array of substantially parallelly disposed inclined surfaces attached to each other laterally at their common tangent points with centers approximately 1-2 inch, preferably about 1.4 inches (center-to-center), apart and a trailing edge 36 raised to a height in a range of about 0.1 and about 1.0 inch, preferably about 0.5 inch off the surface 23 by posts 34 connected at the same tangent points. In a further embodiment, the caps 33 can have approximately 0.5 to 3.0 inch diameter measured at its trailing edge 36, preferably about 1.4 inch diameter. In another embodiment, as illustrated in FIG. 8, the caps 33 of the spray suppression device 10' mounted on the front panel 20' form an array of substantially parallelly disposed inclined surfaces attached to each other laterally and longitudinally at adjacent tangent points.

In one embodiment, each post 34 connects the front panel 20 to a pair of caps 33 and extends down to and beyond the surface 22 of the front panel 20 approximately 0.1 to 1.0 inch, preferably about 0.25 inch, for purposes of spacing and/or attaching the front panel 20 to the back panel 26 to form the flow patch or channel 29. It is to be understood that the device 10 can be used in the form shown in FIG. 2 without a back panel 26.

In one embodiment, at least one flow path 40 is formed for each cap 33 between the panel 20 and the trailing edge 36 of a respective cap 33. The caps 33 are positioned substantially above and in at least partially covering relationship to respective hole 24 in the front panel 20 and each cap 33 at its trailing edge 36 has approximately the same transverse cross-sectional area and shape as the cross-sectional area and shape of each hole 24.

In one embodiment, at least one post 34 which serves for the attachment of a respective pair of caps 33 to the front panel 20 extends outwardly from the front panel 20 to the trailing edge 36 of the cap 33. In that case, the side edges of the post 34 and the trailing edges of the cap 33 defines a flow path 40.

Holes 24 covered by the caps 33 will permit air to flow therethrough while substantially all water sprayed by the wheel of a vehicle and substantially all roadway debris encountered by the mud flap is deflected with water flowing through the holes 24 and channel 29.

Figure 5:
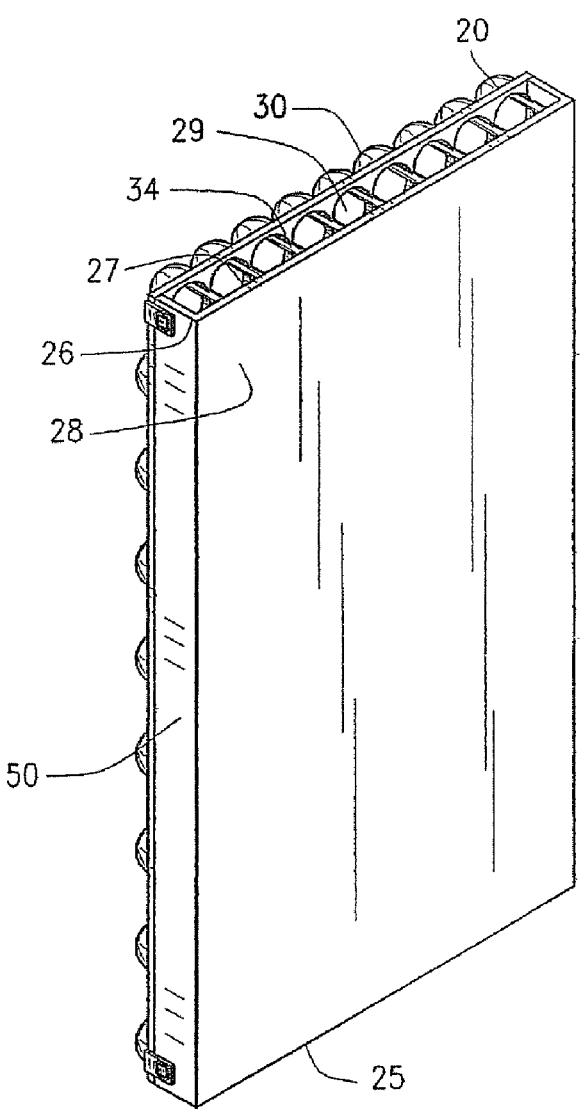
FIG. 5 illustrates a perspective view of one embodiment of the spray suppression device.

In one embodiment, as shown in FIGS. 3 and 5, the spray suppression device 10 comprises a back panel 26 with opposed surfaces 27, 28. The back panel 26 has substantially the same perimeter dimensions as the front panel 20 having surface 22 spaced and is space apart about ¼-½ inch from the surface 27 of the back panel 26. The back panel 26 can be connected to the front panel 20 at both side edges 50. Alternatively, the posts 34 can extend beyond the surface 22 of the front panel 20 and be connected to the surface 27 of the back panel 26. However, the bottom portions of both the front panel 20 and the back panel 26 at the edge 25 are spaced and configured to define air and water flow openings 25. Unlike the front panel 20, the back panel 26 is continuous and does not have through holes for air flow. Thus, air and water passed through the holes 24 of the front panel 20 are encountered by the surface of the back panel 26 and deflected thereby. Further, the energy of the fluid flow is further dissipated by the back panel 26. The air and water deflected by the back panel 26 are then drained into the fluid path defined through the path 29 between the front panel 20 and the back panel 26. The fluid is finally drained out through the opening 25, formed at the bottom edge or the top edge of both panels 20, 26. Thickness of both the front panel 20 and back panel 26 can be in a range of about ¹⁄₁₆ and about ¼ inch.

Figure 6A:
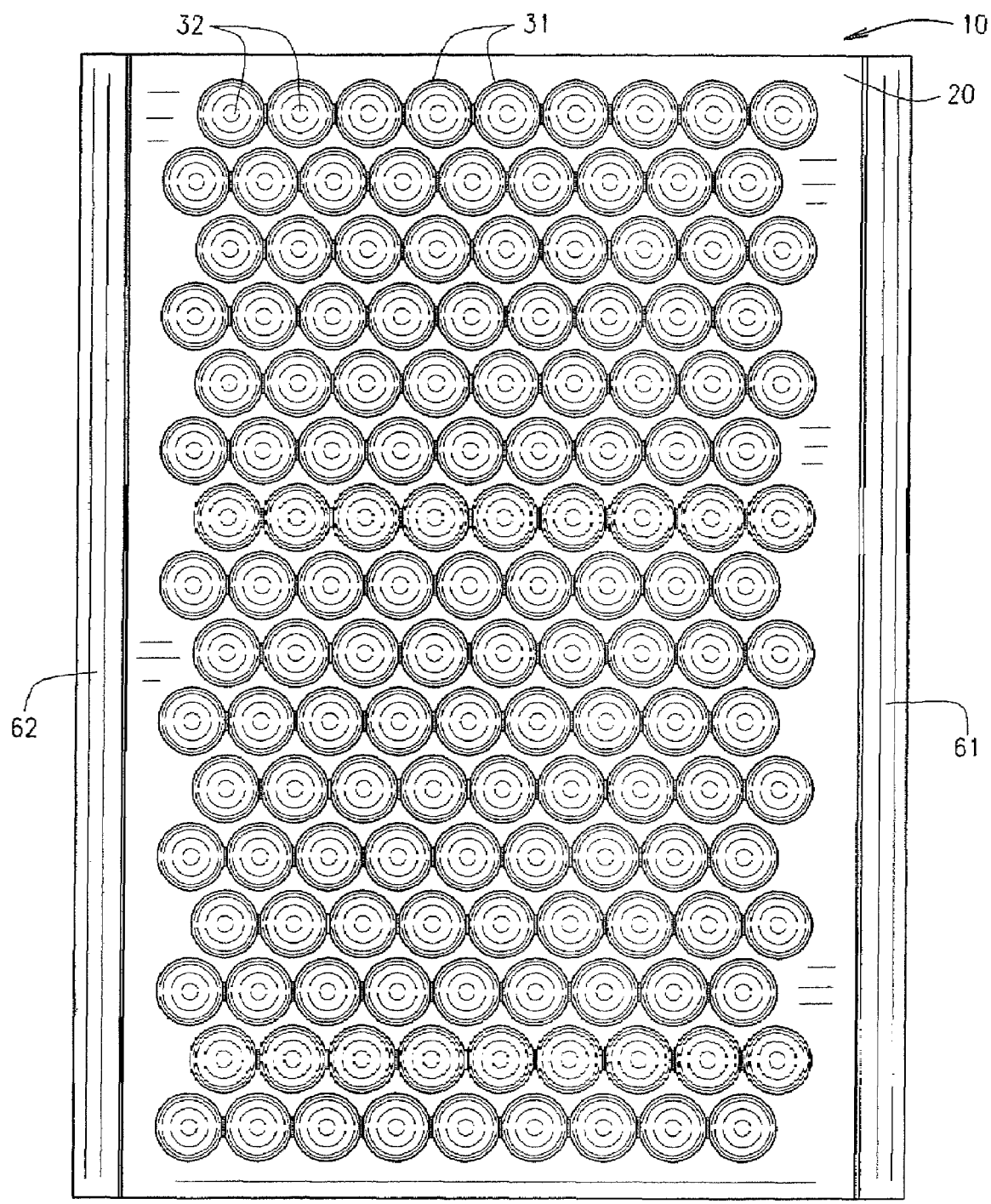
FIG. 6A illustrates a front view of one embodiment of the spray suppression device.
Figure 6B:
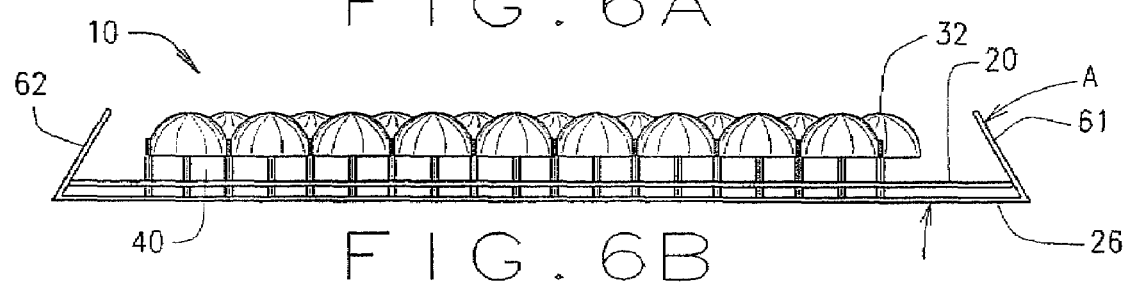
FIG. 6B illustrates a fragmentary side view of one embodiment of the spray suppression device.

In one embodiment, as shown in FIGS. 6A and 6B, the spray suppression device 10 further comprises side wings 61, 62 bent around to capture any splash or spray deflected towards the sides of the front panel 20. The bent side wings 61, 62 are configured to be peripheral ridges running in both side edges of the front panel 20, the length thereof running generally parallel with the longitudinal direction B of the front panel 20. The side wings 61, 62 projects out forwardly from the front panel 20 in the direction towards their leading wheel of the vehicle. In further embodiment, the wings 61, 62 can have slope towards the center longitudinal line of the front panel 20, so that a vertical axis running symmetrically between the wings is inclined at an angle A of from 5° to 90°. The side wings 61, 62 capture some splash or spray deflected or flown from the front panel 20 as well as the cap 33 towards the sides of the front panel 20.

In one embodiment, as shown in FIGS. 7A, 7B and 7C, the spray suppression device 10 further comprises a bottom channel 70 to divert water to side of the front and back panel 20, 26. The bottom channel 70 projects out forwardly from the back panel 26 in the direction towards their leading wheel of the vehicle and extends beyond the surface 22 of the front panel 20. The front wall 72 of the bottom channel 70 projects up to form a channel which transfers the water to the side of the front panel 20. The bottom channel 70 may be configured to be open upwardly and have a bottom wall 71 and the front wall 72 to transfer the water to the side of the front panel 20, the length thereof running substantially parallel with the lateral direction C of the front panel 20. The water drained from the front and back panel 20, 26 flows in the bottom channel 70 to side of the front and back panel 20, 26. In a preferred embodiment, the bottom channel 70 may be configured to be inclined toward either side of the spray suppression device 10, which facilitates the lateral water flow.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A spray suppression device for vehicles comprising:
    a first panel having generally opposed first and second main surfaces and being configured to have a plurality of first through openings spaced apart from each other, each forming a flow path through the first panel;
    a plurality of protrusions mounted to said first panel and positioned to project from the first main surface for substantially facing their leading wheel of the vehicle, each protrusion being positioned substantially above at least one said first opening in said first panel and including a cap and at least one post mounting each said cap to said first panel, each cap including a fixed arcuate shape and forming a second opening between the first main surface and a trailing edge of each said cap.

2. The spray suppression device for vehicles of claim 1 further comprising a cavity formed inside a portion of the protrusion, the cavity being closed at the leading edge of the protrusion, the cavity being open at the trailing edge of a portion of the protrusion.

3. The spray suppression device for vehicles of claim 1 wherein two adjacent caps are configured to share one said post connecting said caps to said first panel.

4. The spray suppression device for vehicles of claim 1 wherein said second openings are defined by the trailing edge of each cap and the side edges of each post.

5. The spray suppression device for vehicles of claim 1 wherein each said cap has at least one of substantially conical, elliptic and parabolic leading surfaces.

6. The spray suppression device for vehicles of claim 1 wherein said caps are attached to each other laterally at adjacent tangent points.

7. The spray suppression device for vehicles of claim 1 wherein said each cap has a contour inclined backwardly and outwardly from its respective apex.

8. The spray suppression device for vehicles of claim 1 wherein each said cap has a leading surface generally in the shape of a segment of a sphere.

9. The spray suppression device for vehicles of claim 1 wherein said second openings have a height in the range of about 0.1 and about 1.0 inch.

10. The spray suppression device for vehicles of claim 1 wherein the protrusions are arranged generally in a plurality of horizontal rows that are spaced apart longitudinally from each other.

11. The spray suppression device for vehicles of claim 1 wherein the first panel being a front panel and the device further comprising a back panel, the back panel being spaced apart from the second main surface of said front panel, the back panel being connected to said front panel.

12. The spray suppression device for vehicles of claim 11 wherein bottom portions of said front panel and said back panel are configured to define fluid flow discharge.

13. The spray suppression device for vehicles of claim 1 further comprising at least one side peripheral ridge running in at least one side edge of said first panel, said at least one side peripheral ridge projecting out from said first panel in the direction towards their leading wheel of the vehicle.

14. The spray suppression device for vehicles of claim 1 further comprising a bottom channel, said bottom channel including a bottom surface and a side wall to form a water channel, said bottom channel forming at the bottom edge of the first panel, said bottom channel projecting out from said first panel in the direction towards their leading wheel of the vehicle.

15. The spray suppression device for vehicles of claim 14 wherein said bottom channel is configured to be inclined toward either side of the first panel.

16. The spray suppression device for vehicles of claim 1 wherein said caps are attached to each other longitudinally at adjacent tangent points.

17. A spray suppression device for vehicles comprising:
    a substantially flat first panel having a plurality of through openings laterally and longitudinally spaced apart from each other;
    a plurality of protrusions each with a cap and at least one post mounting each said cap to said first panel, each cap having a fixed arcuate shape for substantially facing their leading wheel of the vehicle, each cap being positioned substantially above one of said openings in said front panel;
    at least one flow path formed between a said opening and a trailing edge of a respective said cap; and
    wherein each said cap has approximately the same cross-sectional area at the trailing edge as the cross-sectional area of the respective said opening.

18. The spray suppression device for vehicles of claim 17 further comprising a cavity formed inside at least some of the caps, the cavities being closed at the top of the respective cap, and open at the bottom of the respective cap.

19. The spray suppression device for vehicles of claim 17 wherein said flow paths are defined by a trailing edge of each said cap and the side edges of each said post.

20. The spray suppression device for vehicles of claim 17 wherein said caps are substantially in the shape of a segment of a sphere.

21. The spray suppression device for vehicles of claim 17 wherein said caps have at least one of substantially conical, elliptic and parabolic outer surfaces.

22. The spray suppression device for vehicles of claim 17 wherein said flow paths have a height in the range of about 0.1 and about 1.0 inch.

23. The spray suppression device for vehicles of claim 17 wherein said caps are attached to laterally adjacent caps at their tangent points.

24. The spray suppression device for vehicles of claim 17 wherein the first panel being a front panel and the device further comprising a back panel, the back panel being spaced apart from the second main surface of said front panel, the back panel being connected said front panel.

25. The spray suppression device for vehicles of claim 24 wherein bottom portions of said front panel and said back panel are configured to define a fluid flow path.

26. The spray suppression device for vehicles of claim 17 further comprising at least one side peripheral ridge running in at least one side edge of said first panel, said at least one side peripheral ridge projecting out from said first panel in the direction towards their leading wheel of the vehicle.

27. The spray suppression device for vehicles of claim 17 further comprising a bottom channel, said bottom channel including a bottom surface and a side wall to form a water channel, said bottom channel forming at the bottom edge of the first panel, said bottom channel projecting out from said first panel in the direction towards their leading wheel of the vehicle.

28. The spray suppression device for vehicles of claim 27 wherein said bottom channel is configured to be inclined toward either side of the first panel.

29. A spray suppression device for vehicles comprising:
  a first panel having generally opposed first and second main surfaces and being configured to have a plurality of first through openings spaced apart from each other, each forming a flow path through the first panel;
  a plurality of protrusions mounted to said first panel and positioned to project from the first main surface for substantially facing their leading wheel of the vehicle, each protrusion including a cap and at least one post mounting each said cap to said first panel, each cap being positioned substantially above at least one said first opening in said first panel and forming a second opening between the first main surface and a portion of said cap;
  said caps being attached to each other laterally and longitudinally at adjacent tangent points.

30. The spray suppression device for vehicles of claim 29 wherein each said cap has a fixed arcuate shape.

* * * * *

UNITED STATES PATENT AND TRADEMARK OFFICE
CERTIFICATE OF CORRECTION

PATENT NO.       : 7,625,013 B2                                         Page 1 of 1
APPLICATION NO. : 11/552618
DATED            : December 1, 2009
INVENTOR(S)      : Timothy W. Kellick It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Twenty-sixth Day of October, 2010

David J. Kappos
*Director of the United States Patent and Trademark Office*